US012202275B2

(12) United States Patent
Humenick et al.

(10) Patent No.: US 12,202,275 B2
(45) Date of Patent: Jan. 21, 2025

(54) SYSTEMS AND METHODS FOR CONVECTION HEATING FOR DYE SUBLIMATION

(71) Applicant: Sekisui Kydex, LLC, Bloomsburg, PA (US)

(72) Inventors: Jeffrey Humenick, Bloomsburg, PA (US); Jym Kauffman, Bloomsburg, PA (US); Rebecca Gallup, Bloomsburg, PA (US)

(73) Assignee: Sekisui Kydex, LLC, Bloomsburg, PA (US)

( * ) Notice: Subject to any disclaimer, the term of this patent is extended or adjusted under 35 U.S.C. 154(b) by 140 days.

(21) Appl. No.: 17/855,546

(22) Filed: Jun. 30, 2022

(65) Prior Publication Data

US 2023/0001729 A1 Jan. 5, 2023

Related U.S. Application Data

(60) Provisional application No. 63/217,728, filed on Jul. 1, 2021.

(51) Int. Cl.

| | |
|---|---|
| ***B41J 2/335*** | (2006.01) |
| ***B41J 2/315*** | (2006.01) |
| ***B41J 2/325*** | (2006.01) |
| *B41J 2/355* | (2006.01) |
| *B41M 5/382* | (2006.01) |

(52) U.S. Cl.

CPC ............. *B41J 2/3358* (2013.01); *B41J 2/315* (2013.01); *B41J 2/325* (2013.01); *B41J 2/355* (2013.01); *B41J 2202/08* (2013.01); *B41M 5/382* (2013.01)

(58) Field of Classification Search

CPC . B41J 2/3358; B41J 2/315; B41J 2/325; B41J 2/355; B41J 2202/08

See application file for complete search history.

(56) References Cited

U.S. PATENT DOCUMENTS 5,565,903 A 10/1996 Ueda
5,644,351 A 7/1997 Matsumoto et al.
(Continued)

FOREIGN PATENT DOCUMENTS

WO WO-2020/162958 8/2020

OTHER PUBLICATIONS

Invitation to Pay Addtl. Fees on PCT Appl. Ser. No. PCT/US2022/035511, dated Sep. 2, 2022 (2 pages).
(Continued)

*Primary Examiner* — Geoffrey S Mruk
(74) *Attorney, Agent, or Firm* — Foley & Lardner LLP

(57) ABSTRACT

An illustrative heating section in a dye sublimation apparatus may include one or more individually controllable fans. More specifically, a computer or a controller may control speed and/or orientation of the fans for a convective heat transfer to a printed sheet in the heating section. Furthermore, the speed and/or orientation of the fans may be dynamically adjusted based upon the temperature requirement of different stages of the dye sublimation process. Compared to the conventional systems that rely only upon radiative heat which generally results in non-uniform heat distribution within the heating section, the embodiments disclosed herein generate a uniform or nearly uniform heat distribution and also avoid hot spots within the heating section.

10 Claims, 6 Drawing Sheets

200

(56) References Cited

U.S. PATENT DOCUMENTS

| | | | | |
|---|---|---|---|---|
| 6,078,344 | A * | 6/2000 | Wen | B41J 2/315<br>347/212 |
| 2006/0028531 | A1 | 2/2006 | Magee et al. | |
| 2010/0188471 | A1 | 7/2010 | Howell et al. | |
| 2011/0229664 | A1 | 9/2011 | Hoggard | |
| 2012/0196085 | A1 | 8/2012 | Langan et al. | |
| 2015/0029289 | A1 | 1/2015 | Rosner et al. | |

OTHER PUBLICATIONS

ISR and Written Opinion on PCT Application PCT/US2022/035511, Nov. 2022 (11 pages).

International Preliminary Report on Patentability for PCT App. PCT/US2022/035511 dated Dec. 14, 2023 (8 pages).

* cited by examiner

200

300

400

500

600

SYSTEMS AND METHODS FOR CONVECTION HEATING FOR DYE SUBLIMATION

CROSS-REFERENCE TO RELATED APPLICATIONS

This application claims the benefit of and priority to U.S. Provisional Application No. 63/217,728, filed Jul. 1, 2021, the entire disclosure of which is incorporated by reference herein.

TECHNICAL FIELD

This application is directed generally towards a dye sublimation apparatus and more specifically towards convection heating in a dye sublimation process.

BACKGROUND

Dye sublimation is a process of infusing images to a substrate. An image to be infused is printed on a paper (or any type of sheet) using sublimation dyes (contained in the sublimation inks) and the printed paper is pressed against a substrate (generally a thermoplastic material) under heat. The heat causes the dyes to sublimate from a solid state on the printed paper to a gaseous state to travel to the substrate, where the dyes are deposited as solids. This sublimation process therefore infuses the image in the printed paper into the substrate. As the infused image is embedded within the substrate, the image may not chip, fade, or delaminate like the capped and printed images.

A dye sublimation apparatus may have a heating section to generate the heat for sublimating the dyes such that the dye can travel from the printed paper (or printed sheet) to the substrate. For example, FIG. 1 shows a heating section 100 of a dye sublimation apparatus. As shown, the heating section comprises a bank of heaters 102*a*, 102*b*, 102*c*, 102*d* (collectively referred to as heater banks 102) that generates radiating heat 106 towards a printed sheet 104 to sublimate the dyes thereon. More specifically, each of heaters 102*a*, 102*b*, 102*c*, 102*d* generates roughly same quantity of radiating heat 106, the collection of which heats the printed sheet 104.

However, the setup of conventional heating sections and the heating processes in conventional heating sections have technical shortcomings. Continuing with the above example of a conventional heating section 100, the radiating heat 106 generated by the heater banks 102 generates an uneven temperature distribution within the heating section 100. For example, the heated printed sheet 104 or any cover thereto (not shown in FIG. 1) heats the air within the heating section 100 causing the heated air 108 to rise. The heated air 108 tends to accumulate near the heater banks 102 thereby causing a significant temperature difference within the heating section 100. Furthermore, as the radiating heat 106 is brought back to the heater banks 102 by the heated air 108, the heater banks 102 may have to radiate more heat thereby making the conventional heating process more inefficient. As the heaters 102*a*, 102*b*, 102*c*, 102*d* are spatially distributed distinct sources of heat, the radiating heat 106 may not be uniform all over the printed sheet 104 and cause hot spots. For example, the central areas of the printed sheet 104 may develop hot spots. Other areas such as peripheral locations of the printed sheet 104 may not even receive a desired amount of heat while some areas may be overheated.

As such, a significant improvement upon the heaters for dye sublimation is therefore desired.

SUMMARY

What is therefore desired are dye sublimation systems and methods that provide a more uniform heat to a printed sheet placed in a heating section. What is further desired are computer/controller configurable components within the heating section to provide a more uniform heat to the printed sheet.

Embodiments described herein attempt to solve the aforementioned technical problems and may provide other benefits as well. An illustrative heating section in a dye sublimation apparatus may include one or more individually controllable fans. More specifically, a computer or a controller may control speed and/or orientation of the fans for a convective heat transfer to a printed sheet in the heating section. Furthermore, the speed and/or orientation of the fans may be dynamically adjusted based upon the temperature requirement of different stages of the dye sublimation process.

In one embodiment, a dye sublimation apparatus for infusing an image on a printed sheet to a substrate comprises a heating section configured to heat the printed sheet to sublimate one or more dyes forming the image, such that the one or more dyes travel to the substrate in a gaseous state and deposit on the substrate in a solid state to infuse the image on the substrate; the heating section comprising one or more heaters configured to radiate heat towards the printed sheet; and the heating section further comprising one or more fans with individually configurable speed and orientation to convectively transfer the radiated heat to the printed sheet.

In another embodiment, a dye sublimation method for infusing an image on a printed sheet to a substrate comprises heating, by a heating section of a dye sublimation apparatus, the printed sheet to sublimate one or more dyes forming the image such that the one or more dyes travel to the substrate in a gaseous state and deposit on the substrate in a solid state to infuse the image on the substrate, the heating section comprising one or more heaters configured to radiate heat towards the printed sheet; convectively transferring, by one or more fans of the dye sublimation apparatus, the radiated heat to the printed sheet; and configuring, by a processor of the dye sublimation apparatus, speed and orientation of each of the one or more fans.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
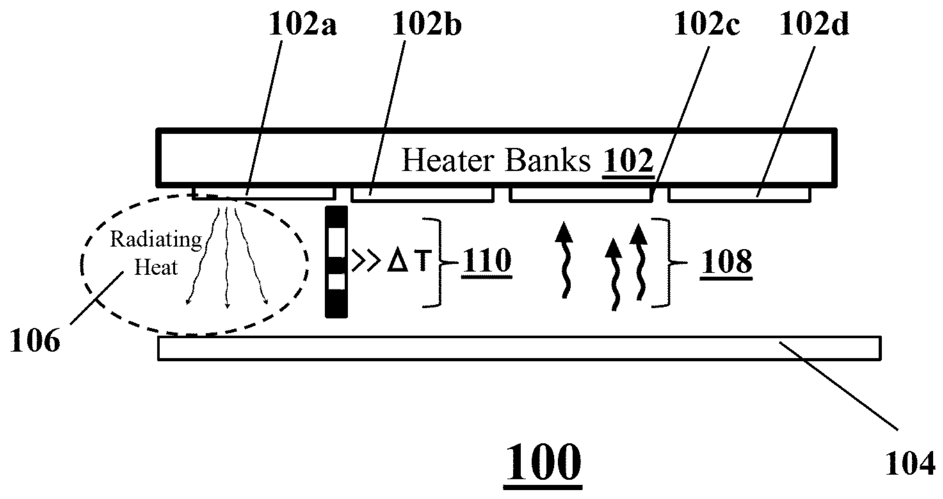
FIG. 1 PRIOR ART
FIG. 1 shows an example of a heating section of a conventional dye sublimation apparatus.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe an improved dye sublimation apparatus that may generate a uniform or nearly uniform heat distribution within a heating section through convective heat transfer. Conventional dye sublimation systems and methods rely upon radiative heat that may generate a non-uniform temperature distribution within the heating section and have a tendency to develop hot spots. A substrate containing a sublimated image using the conventional systems and methods therefore may have a non-uniform quality containing darker areas with excess ink and lighter areas with less than desired ink.

Embodiments disclosed herein utilize individually configurable (or controllable) fans within the heating section to generate a uniform or nearly uniform heat distribution within the heating section of the improved sublimation apparatus. A processor (a term broadly used to encompass both microprocessors and controllers) may control the speed and orientation of each of the fans to maintain the uniform or nearly uniform temperature through convective heat transfer. The radiative heat generated by heating elements (e.g., electric heaters) in the heating section is distributed utilizing the airflow generated by each of the fans. For instance, the each of the four corners of the heating section may have a fan. The processor may cause these fans to orient at a predetermined angle and turn the fan blades at a predetermined speed such that there is a circular airflow generated within the heating section. The circular airflow may convectively distribute the radiative heat generated by the heating elements such that a uniform or nearly uniform distribution of heat is maintained within the heating section. In some embodiments, the processor may dynamically change the speed and the orientation of the fans during a dye-sublimation cycle, e.g., a low-temperature first stage may less likely develop a hot spot and high temperature later stage may likely develop a hot spot that may be avoided through air circulation.

The fans generally may be electrical fans with electric motors providing the motive power to move the fan-blades. The processor may configure the speed of the fans by regulating the control of the current flowing through the corresponding electric motors. Each of the fans may also have one or more motors (or any other actuating mechanism) controlling the orientation of the corresponding fan. The processor may generate actuating instructions to the one or more controlling the orientation of the fans. A thermocouple or any other type temperature measurement sensor may provide temperature feedback to the processor for the processor to configure the speed and orientation of the fans. In some embodiments, the dye sublimation apparatus may include multiple temperature sensors to measure the temperature of the heating section at multiple locations to detect whether hot spots are being formed such that the one or more fans can be configured to generate an airflow away from the potential hot spots.

It should be understood that the use of electric heaters to generate the radiating heat (also referred to as radiative heat) and the electric fans to convectively distribute or transfer the radiative heat is for the ease of illustration and therefore should not be considered limiting. Any type of heating element configured to radiate heat and any type of actuating mechanism configured to convectively distribute the radiated heat through directed airflows should be considered within the scope of this disclosure.

Figure 2:
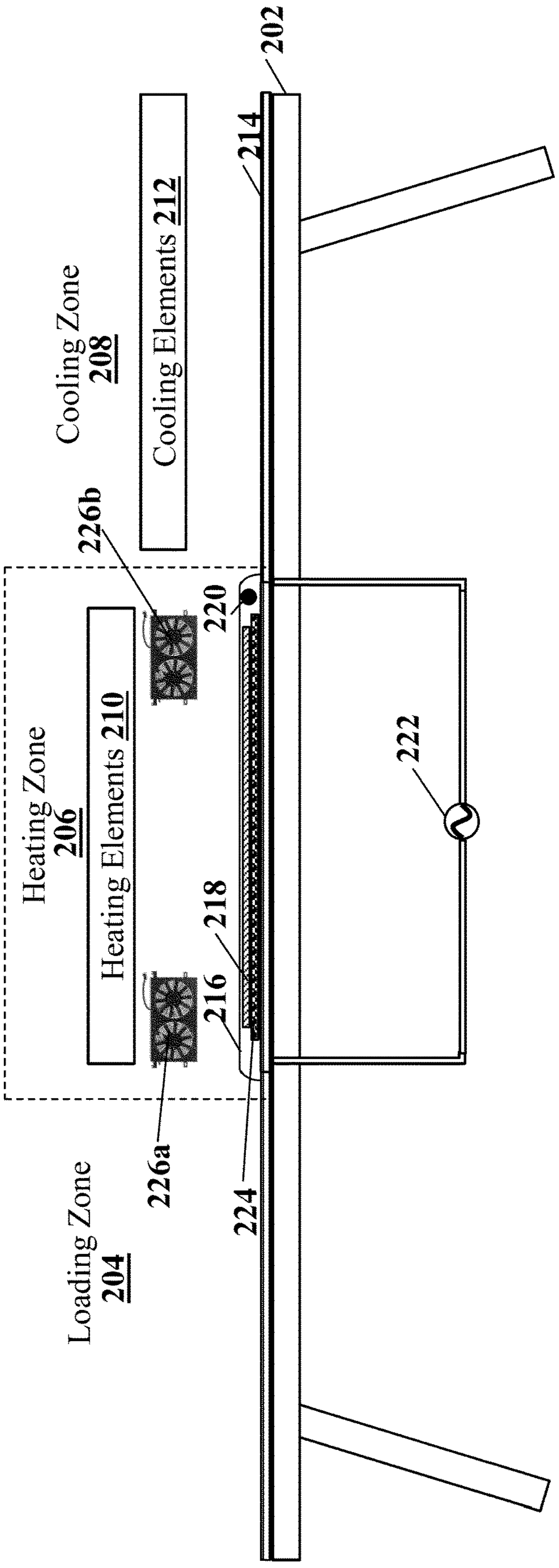
FIG. 2 shows an illustrative dye sublimation apparatus, according to an embodiment.

FIG. 2 shows an illustrative dye sublimation machine (also referred to as dye sublimation apparatus) 200, according to an embodiment. It should be understood that the dye sublimation machine 200 shown in FIG. 2 and described herein is merely for illustration and explanation and machines with other form factors and components should also be considered within the scope of this disclosure. For example, dye sublimation machines having additional, alternative, or a fewer number of components than the illustrative dye sublimation machine 200 should be included within the scope of this disclosure.

The dye sublimation machine 200 may comprise a sublimation table 202, which may provide structural support for the components of the dye sublimation machine 200. The dye sublimation machine 200 in general and the sublimation table 202 in particular may be divided into three zones: a loading zone (also referred to as a loading section) 204, a heating zone (also referred to as heating section) 206, and a cooling zone (also referred to as a cooling section) 208. The loading zone 204 may allow a worker (or a user) to load a printed sheet 218 and a substrate 224. The printed sheet 224 may have an image thereon printed using sublimation inks containing sublimation dyes. The substrate 224 may be of any type of material such as thermoplastic where the image may be infused through the dye sublimation process. The combination of the printed sheet 218 and the substrate 224 may be loaded onto a bed 214 at the loading zone 204. In some embodiments, the bed 214 may be formed by a graphite honeycomb structure. The bed 214 may be configured as a conveyer belt that moves through the loading zone 204, the heating zone 206, and the cooling zone 208.

The heating zone 206 may include heating elements 210. The heating elements 210 may be of any kind such as heating coils in any type configuration. The heating elements 210 may be electrically heated providing a radiative type heating to the combination of the printed sheet 218 and the substrate 224. For example, the heating elements 210 may be included in multiple electrical heaters, each heating a section of the combination of the printed sheet 218 and the substrate. The heating zone 206 may also include a temperature sensor 220 (e.g., a thermocouple) to measure the temperature of the heat generated by the heating elements 210. The heating elements 210 may be within individual heaters that may be individually controlled by one or more controllers. For example, a controller associated with a heater may receive a temperature measurement from the temperature sensor 220 and determine the amount of heat to be radiated by the heater. The heating elements 210 may also be divided into a plurality of zones, each zone containing one or more heaters. Therefore, a corresponding controller may individually control the heat output of each zone to maintain a consistent temperature at the bed 214 within the heating zone 206. Within the heating zone 206, a membrane 216 may cover the combination of the printed sheet 218 and the substrate 224. The membrane 216 may be formed by any kind of material that may withstand the heat for repeated heating cycles in the heating zone 206. A vacuum pump 222 may pull down the membrane 216 such that the membrane 216 may cover the combination of the printed sheet 218 and the substrate 224 snugly without air bubbles.

The cooling zone 208 may cool down the combination of the printed sheet 218 and the substrate 224 after the dye sublimation process in the heating zone 206. The cooling zone 208 may include cooling elements 212 such as cold air blowers to expedite the cooling down process. However, it should be understood that the cooling zone 208 may not necessarily include the cooling elements 212 and the substrate 224 may cool down to ambient temperature without the aid of the cooling elements 212. It should also be understood that the loading zone 204 and the cooling zone 208 may be combined in some embodiments. In these embodiments, the combination of the printed sheet 218 and the substrate 224 may be placed on the combined zone providing both loading and cooling functionality, be moved to the heating zone 206, and moved back to the combined zone for cooling. Therefore, it should generally be understood that the configuration of FIG. 2 is merely illustrative and alternative configurations should also be considered within the scope of this disclosure.

In an illustrative operation, a worker may place the substrate 224 on the loading zone 204 and place the printed sheet 218 directly on the substrate 224. The bed 214 may be configured as a conveyer belt, which may move the combination of the printed sheet 218 and the substrate 224 to the heating zone 206. The heating zone 206 may be a covered area within the dye sublimation machine 200. Within the heating zone 206, the vacuum pump 222 may pull a vacuum between the membrane 216 and the bed 214 such that the membrane 216 presses down on the printed sheet 218. The heating elements 210 may generate a requisite amount of heat to sublimate the ink on the printed sheet 218. The sublimated ink may then be deposited on the substrate 224. The temperature sensor 220 may measure the temperature within the enclosure created by the membrane 216 and the bed 214 and the temperature measurement may be used by the heating elements to regulate the generated heat. After the combination of the printed sheet 218 and the substrate 224 are left in the heating zone 206 for a requisite amount of time (e.g., based upon the properties of the substrate 224), the combination of the printed sheet 218 and the substrate 224 is moved to the cooling zone. As described above, the loading zone 204 may also function as the cooling zone 208. The cooling process in the cooling zone 208 may be expedited by the cooling elements 212, which may provide an active source of cooling such as a flow of cold air. After the combination of the printed sheet 218 and the substrate 224 is sufficiently cooled, the combination is removed from the dye sublimation machine 200. After this process, the image in the printed sheet 218 may be infused (or deposited) into the substrate 224.

The heating zone 206 may include one or more fans for convective heat transfer. Fans 226*a*, 226*b* (collectively or commonly referred to as 226) are shown for reference. In particular, the fans 226 may convectively disperse the heat generated by the heating elements 210 such that the printed sheet 218 may receive an approximately uniform amount of heat. For example, the fans 226 may mitigate the rise of hot air towards the heating elements 210. In some embodiments, one or more computers or controllers may individually control the speed and orientation of each of the fans 226 such that the uniformity of distribution of heat within the heating zone 206 may be maintained throughout the dye sublimation process.

Figure 3:
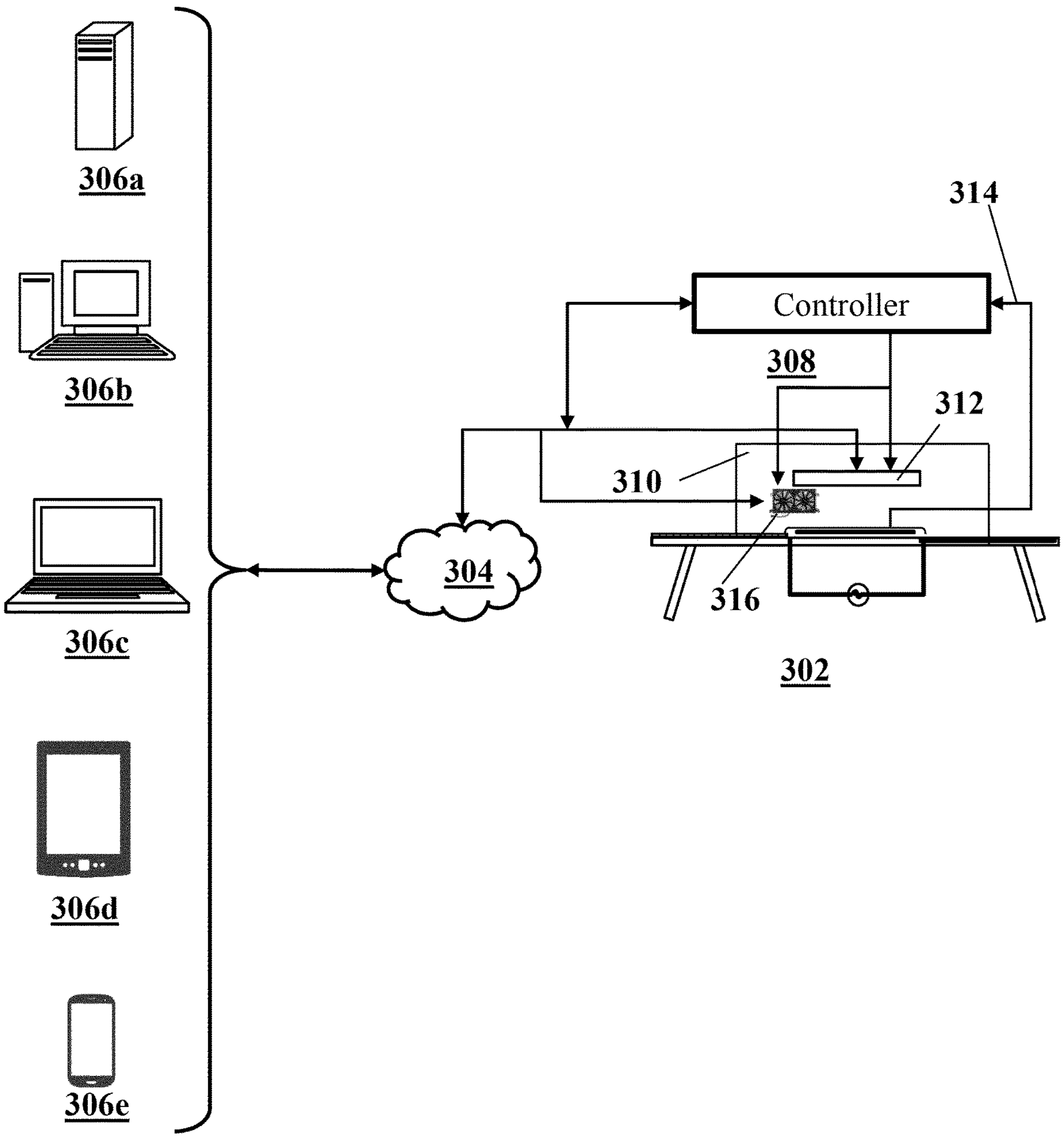
FIG. 3 shows an illustrative system for dye sublimation, according to an embodiment.

FIG. 3 shows an illustrative system 300 for dye sublimation, according to an embodiment. As shown, the system 300 may comprise a dye sublimation apparatus (also referred to as a dye sublimation machine) 302, a network 304, computing devices 306*a*, 306*b*, 306*c*, 306*d*, 306*e* (collectively or commonly referred to as 306), and a controller 308. It should be understood that the system 300 and the aforementioned components are merely for illustration and systems with additional, alternative, and a fewer number of components should be considered within the scope of this disclosure.

The dye sublimation apparatus 302 may be a combination of components that may infuse (or dye sublimate) an image from a printed sheet to a substrate. The image may be printed using sublimation inks containing sublimation dyes that may transform from solid state to gaseous state when heated to a predetermined temperature. The sublimation dyes may travel to the substrate and deposit thereon thereby creating an infused image within the substrate. For the heating part of the dye sublimation process, the dye sublimation apparatus 302 may include a heating section (also referred to as heating zone) 310. The heating section may generally be enclosed for temperature control and to preempt the heat escaping the dye sublimation apparatus 302. The heating section 310 may include a bank of heaters 312, which may be organized into different zones with each zone containing one or more heaters.

The bank of heaters 312 may be controller by a controller 308. The single controller 308 is shown merely for illustration and there may be a plurality of controllers 308 controlling the bank of heaters (also referred to as heater banks) 312. More particularly, the controller 308 may regulate the heat generated by each zone (containing one or more heaters) individually. For example, the controller 308 may increase the heat, decrease the heat, turn ON, or turn OFF the heat generated by a zone by controlling the corresponding heater. The controller 308 may be any kind of hardware and/or software controller, including, but not limited to PID (proportional-integral-derivative) controller and/or any other type of controller. The controller 308 may continuously receive a feedback from the items being heated (e.g., printed sheet, substrate) through a connection 314. The connection 314 may be wired, e.g., a thermocouple providing the feedback to the controller 308, or wireless, e.g., a wireless temperature sensor wirelessly providing the feedback to the controller 308.

In addition to the controller 308, the bank of heaters 312 may be controlled based upon instructions provided by a computing device 306. For example, the computing device 306 may include an interface for a user to enter a desired bed temperature in the heating zone 310 for a particular image and the computing device 306 may provide instructions to the bank of heaters 312 through the network 304 to maintain the temperature. Alternatively or additionally, the computing device 306 may provide the instruction to maintain the temperature to the controller 308. In some embodiments, the computing device 306 may provide instructions to the bank of heaters 312 to maintain a first temperature at a first stage of the dye sublimation process and to maintain a second temperature at a second stage of the dye sublimation process. It should be understood that the instructions to maintain the temperature and the process of maintaining the temperature may be maintained either in hardware, e.g., through the controller 308, or as a combination of hardware and software, e.g., through one or more applications in the computing device 306, the controller 308, and/or other hardware components in the dye sublimation apparatus. In some embodiments, the controller 308 may sequentially activate the heaters in the bank of heaters 312. For example, the dye sublimation process may require a gradual ramping up of the heat and therefore the sequential activation may allow heat to build up to a desired temperature. As another example, activating the heaters at the periphery of the heating section 310 first may allow a controller to determine an amount of heat (generally lesser than the heaters at the periphery) to be generated by heaters at the center of the heating section 310 to maintain a desired temperature within the heating section 310.

The heating section 310 may further include a plurality of fans (an example shown as fan 316) to facilitate a convective heat transfer from the bank of heaters to the printed sheet. The fan 316 may receive control signals from the controller 308 and/or control instructions from the computing devices 306. The control signals/instructions may cause the fan 316 to turn ON, turn OFF, change speed, and/or change orientation. The control signals/instructions may be based upon feedback (e.g., temperature measurement) received by the controller 308 and/or the computing device 306. Utilizing the fan 316, the system 300 may be able to maintain a uniform or nearly uniform temperature distribution within the heating section 310 of the dye sublimation apparatus 302.

The computing devices 306 may include any type processor based device that may execute one or instructions (e.g., instructions to cause a uniform temperature distribution in the heating section 310) to the dye sublimation apparatus 302 through the network 304. Non-limiting examples of the computing devices 306 include a server 306*a*, a desktop computer 306*b*, a laptop computer 306*c*, a tablet computer 306*d*, and a smartphone 306*e*. However, it should be understood that the aforementioned devices are merely illustrative and other computing devices should also be considered within the scope of this disclosure. At minimum, each computing device 306 may include a processor and non-transitory storage medium that is electrically connected to the processor. The non-transitory storage medium may store a plurality of computer program instructions (e.g., operating system, applications) and the processor may execute the plurality of computer program instructions to implement the functionality of the computing device 306.

The network 304 may be any kind of local or remote network that may provide a communication medium between the computing devices 306 and the dye sublimation apparatus 302. For example, the network 304 may be a local area network (LAN), a desk area network (DAN), a metropolitan area network (MAN), or a wide area network (WAN). However, it should be understood that aforementioned types of networks are merely illustrative and any type of component providing the communication medium between the computing devices 306 and the dye sublimation apparatus 302 should be considered within the scope this disclosure. For example, the network 304 may be a single wired connection between a computing device 306 and the dye sublimation apparatus 302.

Figure 4:
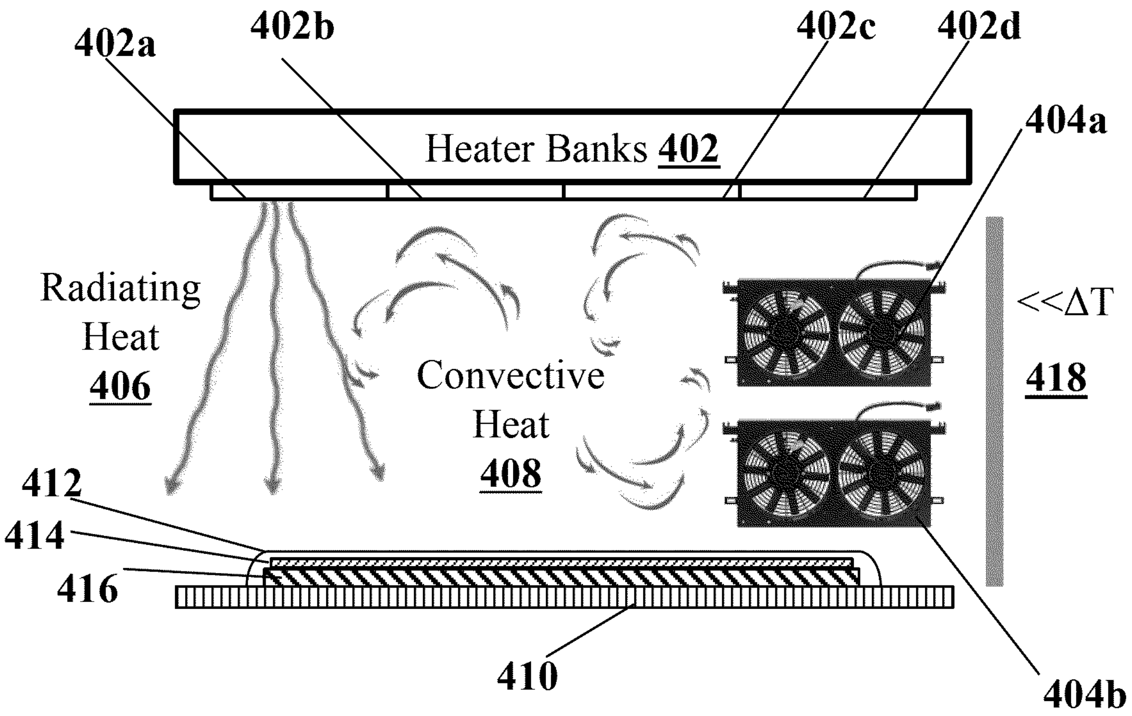
FIG. 4 shows an illustrative heating section of a dye sublimation apparatus, according to an embodiment.

FIG. 4 shows an illustrative heating section 400 of a dye sublimation apparatus, according to an embodiment. It should be understood that the components of the heating section 400 shown in FIG. 4 and described herein are merely illustrative and additional, alternative, and fewer number of components should also be considered within the scope of this disclosure. The heating section 400 may comprise a bank of a plurality of heaters 402*a*, 402*b*, 402*c*, 402*d* (collectively referred to as heater banks 402) that may generate radiating heat (also referred to as radiative heat) 406 and a plurality of fans 404*a*, 404*b* (commonly or collectively referred to as 404) to convert at least a portion of the radiating heat 406 to convective heat 408. The radiative heat 406 and convective heat 408 may cause dyes in a printed sheet 414 to sublimate and get deposited to a substrate 416 thereby infusing an image in the printed sheet 414 to the substrate 416. As shown, the substrate 416 may be on a bed 410, which may be a conveyer belt and the combination of the printed sheet 414 and the substrate 416 may be under a membrane 412 may be snugly hold the printed sheet 414 and the substrate 416.

The heater banks 402 may include any type of heating element that may generate the radiating heat 406. For example, the heater banks 402 may include an electric heating element such as a heating coil that can be controlled by a controller. As another example, the heater banks 402 may include a chemical heating element that may chemically generate the radiating heat 406. It should be understood that these forms of heating are merely illustrative and any type of mechanism that generates the radiating heat 406 should be considered within the scope of this disclosure.

The fans 404 may any type of component that may cause air movement within the heating section 400 to generate the convective heat 408 from the radiating heat 406. The fans 404 may be powered by any of power source. For example, the fans 404 may be electric with an electric motor providing the motive power to move the fan blades. A controller may provide control signals to control the fans 404. Additionally or alternatively, a computer may generate instructions to control the fans 404. The control signals and/or the instructions may cause the fans 404 to switch ON, switch OFF, change speed, and/or change orientation (e.g., to change the direction of airflow within the heating section 400). The control signals and/or the instructions may be based upon a feedback (e.g., a continuous temperature measurement) from the heating section 400.

In some embodiments, the controller and/or computer may dynamically control the various operational attributes of the fans 404 during dye sublimation. For example, the computer and/or the controller may cause the fans 404 to move with a first speed at the beginning of a dye sublimation cycle and with a second speed as the later stages of the dye sublimation cycle. Furthermore, the computer and/or the controller may periodically switch the fans 404 ON or OFF based on the amount of airflow required to maintain a uniform or nearly uniform temperature within the heating section 400. The computer and/or the controller may dynamically change the orientation of the fans 404 based upon the desired direction of airflow. For example, if the computer and/or the controller detects a potential hot spot build up, the computer and/or the controller may cause the fans 404 to direct an airflow away from the spot such that the excess heat may be carried away by the airflow. By the dynamic control of the fans 404, the computer and/or the controller may maintain a uniform or nearly uniform temperature distribution 418 (e.g., with temperature difference below a threshold, $\Delta T$) within the heating section 400. In some embodiments, the computer and/or the controller may maintain static speed and a static orientation of the fans 404 during the entirety of the sublimation cycle.

Figure 5:
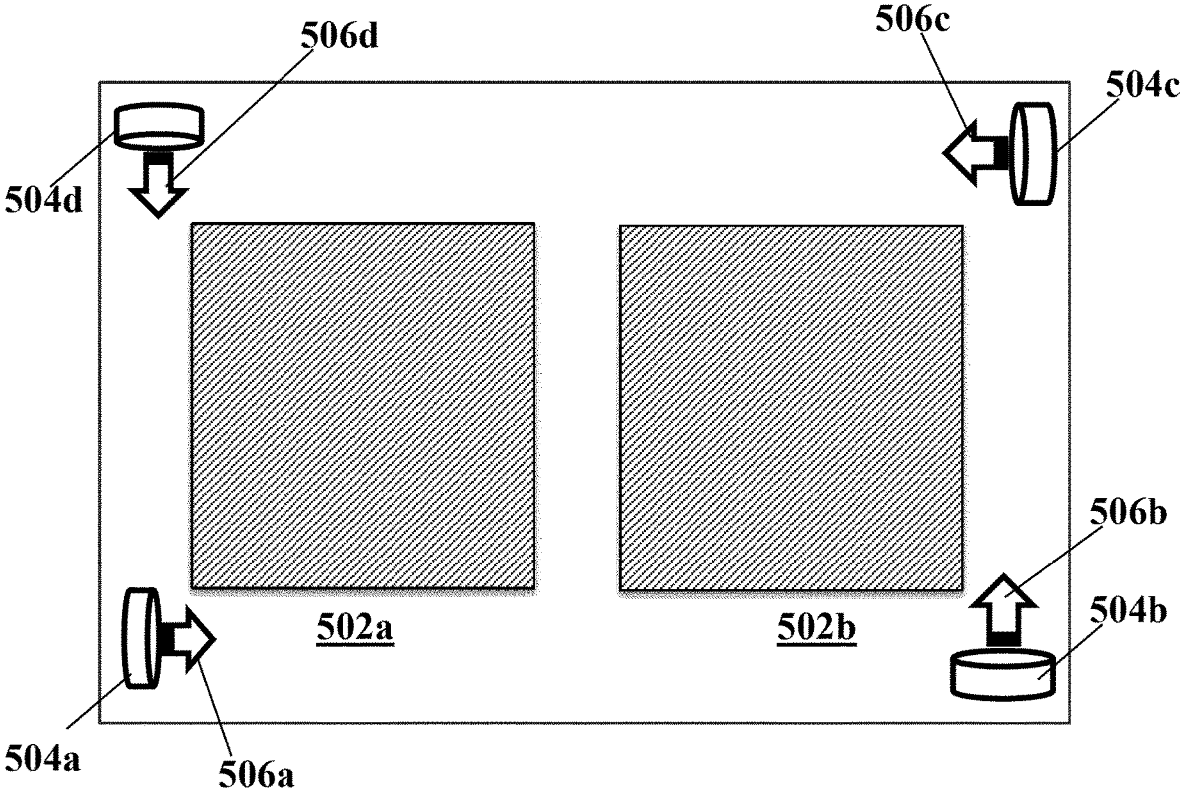
FIG. 5 shows an illustrative heating section of a dye sublimation apparatus, according to an embodiment.

FIG. 5 shows an illustrative heating section 500 of a dye sublimation apparatus, according to an embodiment. More particularly, FIG. 5 shows a top view of heating section 500. As shown, the heating section 500 may include printed sheets 502*a*, 502*b* (collectively or commonly referred to as 502) and fans 504*a*, 504*b*, 504*c*, 504*d* (collectively or commonly referred to as 504). It should be understood that the components of the heating section 500 as shown in FIG. 5 and described herein are merely illustrative and additional, alternative, and fewer number of components should be considered within the scope of this disclosure.

Each of the printed sheet 502*a*, 502*b* may include an image printed thereon using sublimation dyes. The sublimation dyes may change directly from solid state to gaseous state under heat, travel to corresponding substrates in gaseous state, and deposit into the substrate in a solid state thereby infusing the images into the corresponding substrates. Although FIG. 5 shows the heating section 500 configured for two printed sheets 502*a*, 502*b*, heating sections configured for any number of printed sheets should be considered within the scope of this disclosure.

The fans 504 may be a kind of air blowing mechanism that may generate the airflows 506*a*, 506*b*, 506*c*, 506*d* (collectively or commonly referred to as 506). For example, the fans 504 may be electric, i.e., where the motive power of fan blades is provided by electric motors. The airflows 506 generated by the fans 504 may cause radiating heat generated by heater banks (not shown) in the heating section to convert to convective heat.

One or more processors and/or controllers may control the speed and the orientation of the fans 504. To control the speed, the processors and/or the controllers may regulate the flow of current in the motors providing the motive power to the fan blades of the corresponding fans 504. To control the orientation, each of the fans 504 may have one or more actuation mechanisms (e.g., electric motors) to angularly move the corresponding fan 504. The processors and/or the controllers may provide control instructions and/or control signals to the actuation mechanisms to configure the orientation of the corresponding fans 504.

Figure 6:
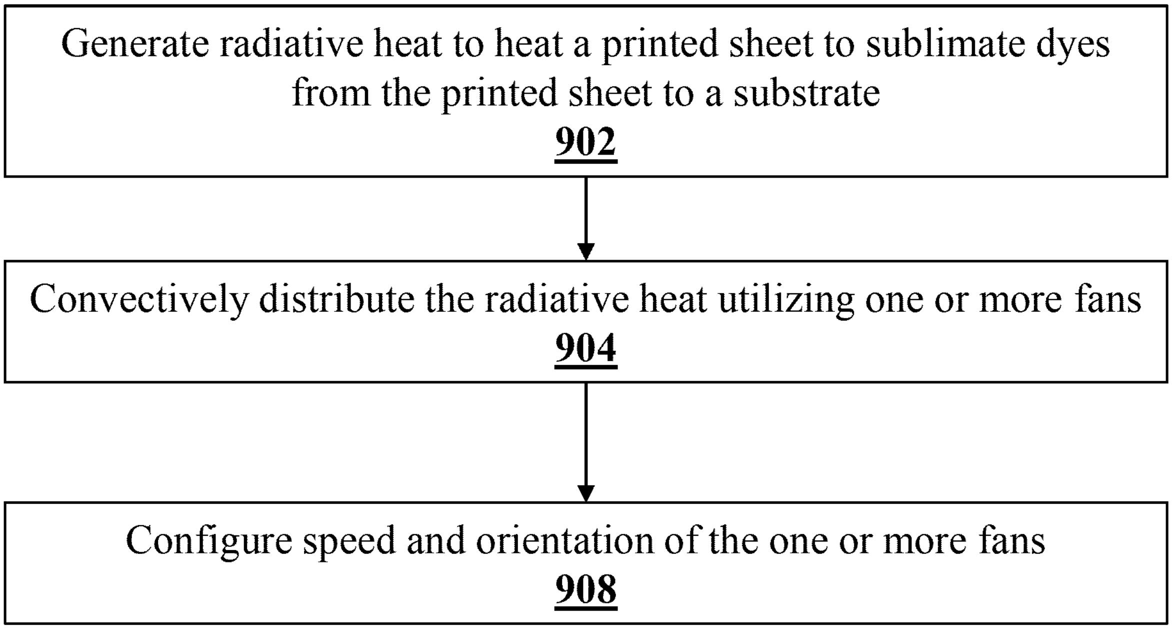
FIG. 6 shows a flow diagram of an illustrative method for dye sublimation, according to an embodiment.

FIG. 6 shows a flow diagram of an illustrative method 600 for dye sublimation, according to an embodiment. The steps of the method 600 described herein are merely illustrative and methods with alternative, additional, and fewer number of steps should also be considered within the scope of this disclosure.

The method may begin at step 602 where a plurality of heating elements may generate radiative heat (also referred to as radiating heat) to heat a printed sheet to sublimate dyes from the printed sheet to a substrate. The heating elements may be within a heating section of a dye sublimation apparatus (also referred to as a dye sublimation machine) configured as bank of heaters. Generally, the heating elements may radiate the heat downward towards the printed sheet that may be pressed onto a substrate using a vacuum pulled membrane.

At step 604, one or more fans may convectively distribute the radiative heat. The one or more fans may provide corresponding airflows that that distribute the radiative heat while avoiding hotspots. For instance, the one or more fans may collectively generate a circular airflow within the heating section such that there is a uniform or nearly uniform temperature distribution within the heating section.

At step 606, a processor may configure the speed and the orientation of the one or more fans. It should be understood that the term "processor" as used herein may include microprocessors that generate control instructions and controllers that generate control signals. The processor may configure the speed and orientation based upon temperature feedback provided by one or more temperature sensors (e.g., a thermocouple) within the heating section. In some embodiments, the processor may maintain a static configuration of the speed and orientation of the one or more fans during a sublimation cycle. In other embodiments, the processor may dynamically configure the speed and orientation during the sublimation cycle.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A dye sublimation apparatus for infusing an image on a printed sheet to a substrate, the dye sublimation apparatus comprising:

a heating section configured to heat the printed sheet to sublimate one or more dyes forming the image, such that the one or more dyes travel to the substrate in a gaseous state and deposit on the substrate in a solid state to infuse the image on the substrate;

the heating section comprising one or more heaters configured to radiate heat towards the printed sheet; and the heating section further comprising one or more fans with an individually configurable speed and orientation to convectively transfer the radiated heat to the printed sheet.

2. The dye sublimation apparatus of claim 1, further comprising:

a processor configured to transmit control instructions to change an orientation of the one or more fans.

3. The dye sublimation apparatus of claim 1, further comprising:

a controller configured to transmit control signals to the one or more fans.

4. The dye sublimation apparatus of claim 1, wherein the one or more fans are configured to generate corresponding airflows to maintain a uniform or an approximately uniform temperature within the heating section.

5. The dye sublimation apparatus of claim 1, further comprising:

a thermocouple configured to provide a temperature measurement to a processor or a controller controlling the one or more fans.

6. The dye sublimation apparatus of claim 1, wherein the orientation of each of the one or more fans is configured to generate circular airflow within the heating section.

7. The dye sublimation apparatus of claim 1, wherein the one or more fans are located at corresponding corners of the heating section.

8. The dye sublimation apparatus of claim 1, wherein the heating section further comprises a plurality of heating elements configured to generate the radiated heat.

9. The dye sublimation apparatus of claim 1, wherein the speed and the orientation of the one or more fans are dynamically configured during a sublimation cycle.

10. The dye sublimation apparatus of claim 1, wherein the one or more fans are configured to convectively transfer the radiated hear to a section of the printed sheet at the same time the one or more heaters are configured to radiate heat towards the section of the printed sheet.

* * * * *